(12) United States Patent
Kim (10) Patent No.: US 10,964,077 B2
(45) Date of Patent: Mar. 30, 2021

(54) APPARATUS AND METHOD FOR CLUSTERING POINT CLOUD

(71) Applicants: Hyundai Motor Company, Seoul (KR); Kia Motors Corporation, Seoul (KR)

(72) Inventor: Jae Kwang Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/547,119

(22) Filed: Aug. 21, 2019

(65) Prior Publication Data

US 2020/0242820 A1 Jul. 30, 2020

(30) Foreign Application Priority Data

Jan. 30, 2019 (KR) .................... 10-2019-0011796

(51) Int. Cl.
*G01S 17/89* (2020.01)
*G01S 17/42* (2006.01)
*G01S 17/931* (2020.01)
*G06T 11/20* (2006.01)
*G06K 9/62* (2006.01)
*G06K 9/00* (2006.01)
*G01S 7/48* (2006.01)

(52) U.S. Cl.
CPC .......... *G06T 11/206* (2013.01); *G01S 7/4802* (2013.01); *G01S 17/42* (2013.01); *G01S 17/89* (2013.01); *G01S 17/931* (2020.01); *G06K 9/00791* (2013.01); *G06K 9/6218* (2013.01)

(58) Field of Classification Search
CPC .... G06T 11/206; G01S 17/931; G01S 7/4802; G01S 17/42; G01S 17/89; G06K 9/00791; G06K 9/6218
See application file for complete search history.

(56) References Cited

U.S. PATENT DOCUMENTS

| 8,948,501 | B1* | 2/2015 | Kim | ............ | G06K 9/00711 |
| | | | | | 382/159 |
| 2014/0324483 | A1* | 10/2014 | Plummer | ........... | G06Q 30/0278 |
| | | | | | 705/4 |
| 2015/0063707 | A1* | 3/2015 | Fu | .............. | G06K 9/00201 |
| | | | | | 382/199 |
| 2017/0365068 | A1* | 12/2017 | Tan | ............... | G01S 17/42 |
| 2019/0086546 | A1* | 3/2019 | Tsishkou | ........... | G06K 9/00201 |

FOREIGN PATENT DOCUMENTS

KR 2015-0043892 A 4/2015

* cited by examiner

*Primary Examiner* — Jitesh Patel
(74) *Attorney, Agent, or Firm* — Mintz Levin Cohn Ferris Glovsky and Popeo, P.C.; Peter F. Corless (57) ABSTRACT

An apparatus for clustering a point cloud can include: a three-dimensional (3D) light detection and ranging (LiDAR) sensor configured to generate a point cloud around a vehicle and a controller configured to project the point cloud generated by the 3D LiDAR sensor onto a circular grid map to be converted into two-dimensional (2D) points, the circular grid map including a plurality of cells, and to cluster the 2D points on the circular grid map.

18 Claims, 11 Drawing Sheets

APPARATUS AND METHOD FOR CLUSTERING POINT CLOUD

CROSS-REFERENCE TO RELATED APPLICATION

This application claims the benefit of priority to Korean Patent Application No. 10-2019-0011796, filed in the Korean Intellectual Property Office on Jan. 30, 2019, the entire contents of which are incorporated herein by reference.

TECHNICAL FIELD

The present disclosure relates to an apparatus and method for clustering a point cloud.

BACKGROUND

In general, a point cloud refers to a set of data on a coordinate system. The point cloud is defined as x-, y-, and z-coordinates in a three-dimensional (3D) coordinate system and typically indicates an external surface of an object.

Such a point cloud may be generated by a 3D light detecting and ranging (LiDAR) sensor. Many modern vehicles are equipped with a 3D LiDAR sensor for detecting surrounding vehicles, lanes, and various obstructions.

Because the 3D LiDAR sensor generates a large number of point clouds in the area surrounding the vehicle, there is a need for efficient clustering technologies. A conventional technology for clustering point clouds projects a point cloud (3D points) onto a two-dimensional (2D)-shaped square grid map to be converted into 2D points. The converted 2D points are then clustered on the square grid map using the "8-neighborhood" technique.

However, when the conventional point cloud clustering technique sets a cell on the square grip map to a large size, points indicating different objects located in a short range are clustered as one. Conversely, when the conventional point cloud clustering technique sets a cell on the square grip map to a small size, points indicating one object located in a long range are separately clustered upon clustering.

As a result, it is difficult to optimally cluster all points indicating a long-range object and all points indicating a short-range object.

SUMMARY

The present disclosure has been made to solve the above-mentioned problems occurring in the related art while advantages achieved by the related art are maintained intact.

An aspect of the present disclosure provides an apparatus and method for clustering a point cloud to optimally cluster all points indicating a long-range object and all points indicating a short-range object by projecting a point cloud obtained by means of a 3D LiDAR sensor onto a 2D circular grid map to be converted into 2D points. Then, the 2D points on the circular grid map can be clustered based on a size of a reference cell.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for clustering a point cloud may include: a three-dimensional (3D) light detection and ranging (LiDAR) sensor configured to generate a point cloud around a vehicle and a controller configured to project the point cloud generated by the 3D LiDAR sensor onto a circular grid map to be converted into two-dimensional (2D) points, the circular grid map including a plurality of cells, and to cluster the 2D points on the circular grid map.

The circular grid map may include a plurality of circles. Each of the plurality of circles may have a different size. Each of the plurality of circles may use as an origin thereof a center of the vehicle. Each of the plurality of circles may include a plurality of straight lines connected from the origin to a circular arc. The plurality of straight lines may be spaced apart from each other at a threshold angle.

A first straight line may configure a first cell generated by a first circle of the plurality of circles. The first circle may be the smallest circle of the plurality of circles. A second straight line may configure a second cell generated by a second circle of the plurality of circles at an outer portion of the first circle. A third straight line may configure a third cell generated by a third circle of the plurality of circles at an outer portion of the second circle. The first straight line may be shorter in length than the second straight line. The second straight line may be shorter in length than the third straight line.

The controller may be configured to detect a plurality of representative points for each cell of the circular grid map and determine whether to perform clustering between the respective representative points based on the representative point for each cell.

The controller may be configured to set a plurality of reference points for each cell of the circular grid map and detect a 2D point located closest to each of the plurality of reference points as the representative point for each cell.

The plurality of reference points may be located on a boundary line of a given cell of the plurality of cells.

The controller may be configured to cluster a representative point of a first cell of the plurality of cells and a representative point of a second cell of the plurality of cells when the representative point of the first cell and the representative point of the second cell are included in a reference frame.

A shape and a size of the reference frame may correspond to a shape and a size of the first cell, or the shape and the size of the reference frame may correspond to a shape and size of the second cell.

The controller may be configured to recognize one cluster as one object. The object may be a vehicle.

Furthermore, according to embodiments of the present disclosure, a method for clustering a point cloud may include: generating, by a 3D LiDAR sensor of a vehicle, a point cloud around the vehicle, projecting, by a controller of the vehicle, the point cloud onto a circular grid map to be converted into two-dimensional (2D) points, the circular grid map including a plurality of cells, and clustering, by the controller, the 2D points on the circular grid map.

The circular grid map may include a plurality of circles. Each of the plurality of circles may have a different size. Each of the plurality of circles may use as an origin thereof a center of the vehicle. Each of the plurality of circles may include a plurality of straight lines connected from the origin to a circular arc. The plurality of straight lines may be spaced apart from each other at a threshold angle.

A first straight line may configure a first cell generated by a first circle of the plurality of circles. The first circle may be the smallest circle of the plurality of circles. A second straight line may configure a second cell generated by a second circle of the plurality of circles at an outer portion of the first circle. A third straight line may configure a third cell generated by a third circle of the plurality of circles at an outer portion of the second circle. The first straight line may be shorter in length than the second straight line. The second straight line may be shorter in length than the third straight line.

The clustering of the 2D points on the circular grid map may include detecting a plurality of representative points for each cell of the circular grid map and determining whether to perform clustering between the respective representative points based on the representative point for each cell.

The detecting of the plurality of representative points may include setting a plurality of reference points for each cell of the circular grid map and detecting a 2D point located closest to each of the plurality of reference points as the representative point for each cell.

The plurality of reference points may be located on a boundary line of a given cell of the plurality of cells.

The determining whether to perform the clustering may include clustering a representative point of a first cell of the plurality of cells and a representative point of a second cell of the plurality of cells when the representative point of the first cell and the representative point of the second cell are included in a reference frame.

A shape and a size of the reference frame may correspond to a shape and a size of the first cell, or the shape and the size of the reference frame may correspond to a shape and size of the second cell.

The method may further include recognizing, by the controller, one cluster as one object. The object may be a vehicle.

BRIEF DESCRIPTION OF THE DRAWINGS

The above and other objects, features and advantages of the present disclosure will be more apparent from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be ruled out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 1:
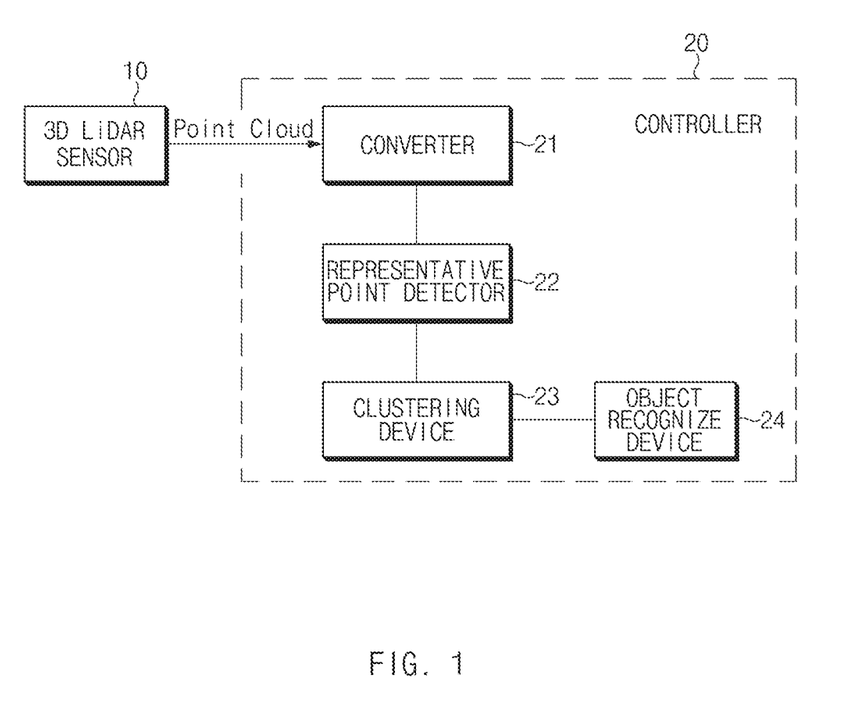
FIG. 1 is a block diagram illustrating a configuration of an apparatus for clustering a point cloud according to embodiments of the present disclosure.
Figure 2:
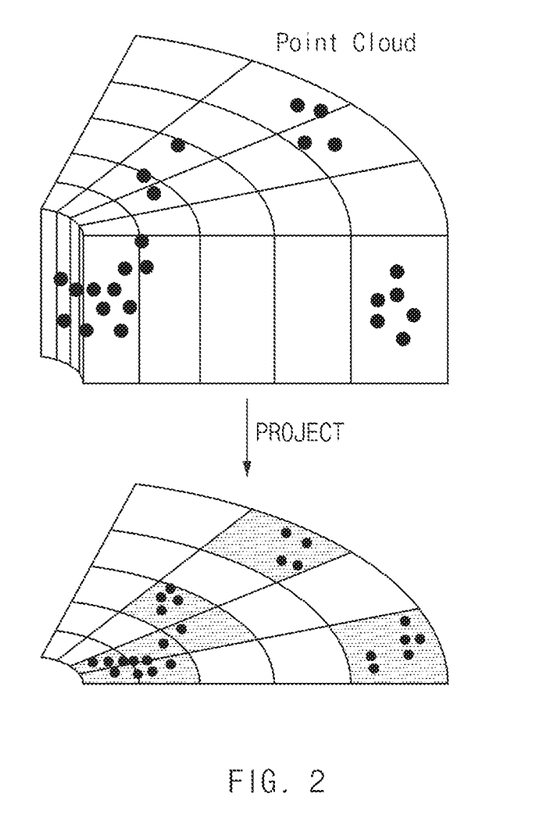
FIG. 2 is a drawing illustrating a state where an apparatus for clustering a point cloud projects the point cloud onto a circular grid map to be converted into two-dimensional (2D) points according to embodiments of the present disclosure.

Referring now to the presently disclosed embodiments, FIG. 1 is a block diagram illustrating a configuration of an apparatus for clustering a point cloud according to embodiments of the present disclosure. FIG. 2 is a drawing illustrating a state where an apparatus for clustering a point cloud projects the point cloud onto a circular grid map to be converted into two-dimensional (2D) points according to embodiments of the present disclosure.

As shown in FIG. 1, the apparatus for clustering the point cloud according to embodiments of the present disclosure may include a three-dimensional (3D) light detection and ranging (LiDAR) sensor 10 and a controller 20.

Referring to the respective components, first of all, the 3D LiDAR sensor 10 may be loaded into a vehicle and may generate a point cloud in a form shown in FIG. 2, as the result of detecting an object around the vehicle. In this case, respective points configuring the point cloud indicate data having three-dimensional (3D) coordinate values.

The controller 20 may perform overall control such that the respective components normally perform their own functions. Such a controller 20 may be implemented in the form of hardware or software or in the form of a combination thereof. Preferably, the controller 20 may be implemented as, but not limited to, a microprocessor.

Furthermore, the controller 20 may project the point cloud obtained by means of the 3D LiDAR sensor 10 on to a 2D circular grid map (an x-y plane) to be converted into 2D points and may cluster 2D points on the circular grid map based on a size of a reference cell. In this case, the point cloud may be data having 3D coordinate values (x, y, z), but, when the point cloud is projected onto the 2D circular grid map, it may be converted into data (2D points) having x and y values in which a z value is deleted from the 3D coordinate values (x, y, z).

Furthermore, the controller 20 may further include a storage (not shown) which stores various logics, algorithms, and programs required to project the point cloud obtained by means of the 3D LiDAR sensor 10 onto the 2D circular grid map to be converted into the 2D points and cluster the 2D points on the circular grid map based on the size of the reference cell. In this case, the storage may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Such a controller 20 may include function blocks, such as a converter 21, a representative point detector 22, and a clustering device 23, and may perform all a function of the converter 21, a function of the representative point detector 22, and a function of the clustering device 23, the functions being described below. In this case, the respective function blocks may be combined with each other to form one function block, and some function blocks may be omitted according to a manner which executes an embodiment of the present disclosure.

Hereinafter, seeing the respective function blocks, first of all, as shown in FIG. 2, the converter 21 may project the point cloud obtained by means of the 3D LiDAR sensor 10 onto the 2D circular grid map to be converted into 2D points.

Only a part of the 2D circular grid map is shown in FIG. 2. The entire 2D circular grid map is shown in FIG. 3.

Figure 3:
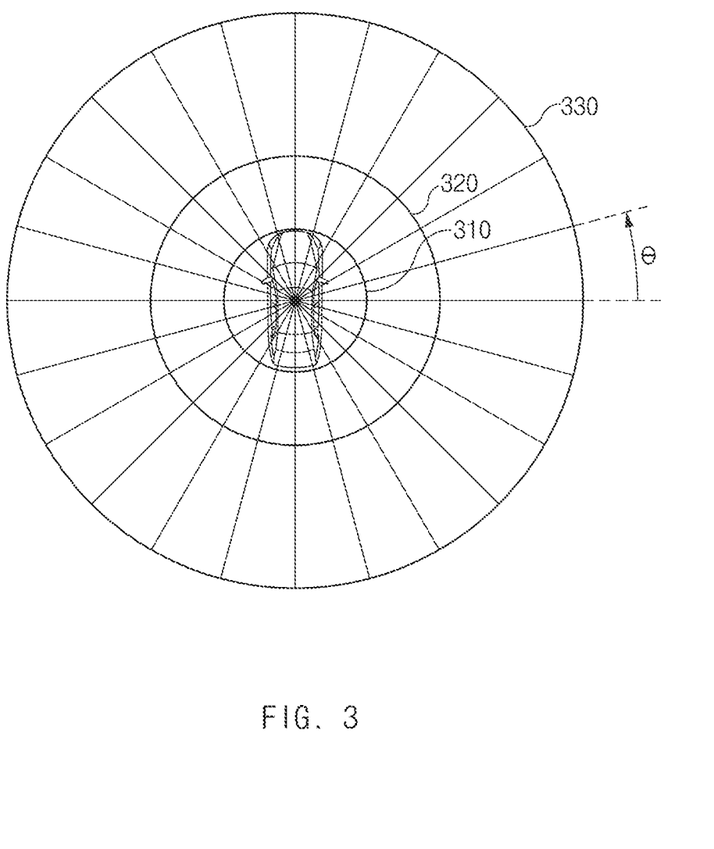
FIG. 3 is a drawing illustrating a structure for a circular grid map used for an apparatus for clustering a point cloud to convert the point cloud into 2D points according to embodiments of the present disclosure.
Figure 4A:
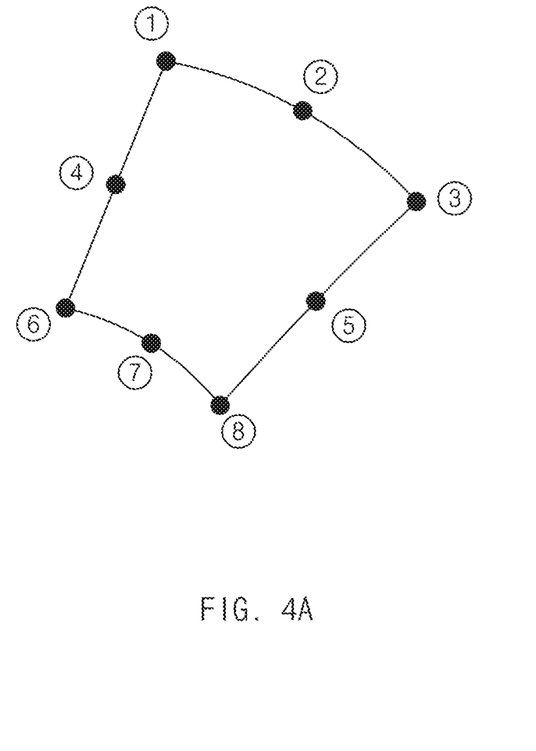
FIG. 4A is a drawing illustrating reference points set in a cell by an apparatus for clustering a point cloud according to embodiments of the present disclosure.
Figure 4B:
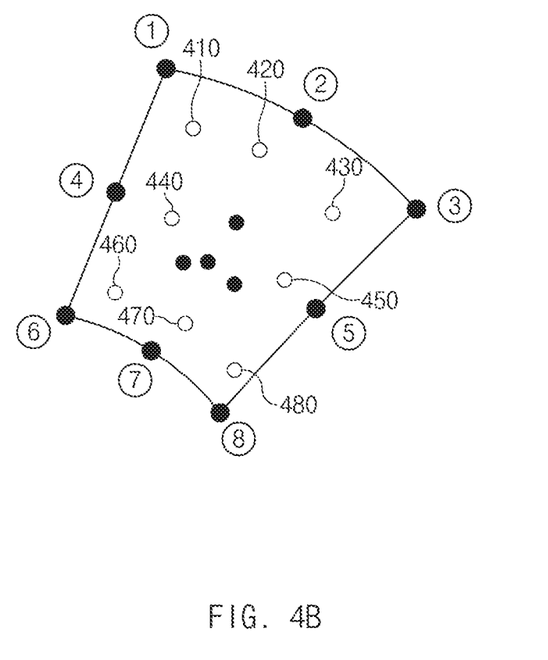
FIG. 4B is a drawing illustrating a process of detecting a plurality of representative points among 2D points in a cell in an apparatus for clustering a point cloud according to embodiments of the present disclosure.
Figure 5A:
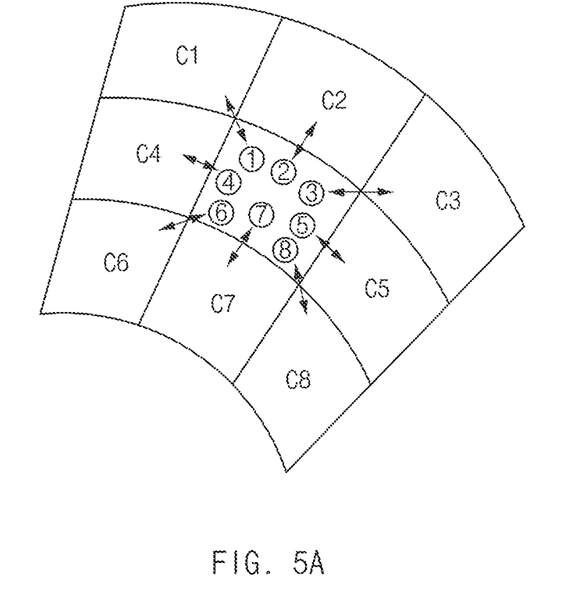
FIG. 5A is a drawing illustrating a manner for comparing representative points between respective cells in an apparatus for clustering a point cloud according to embodiments of the present disclosure.
Figure 5B:
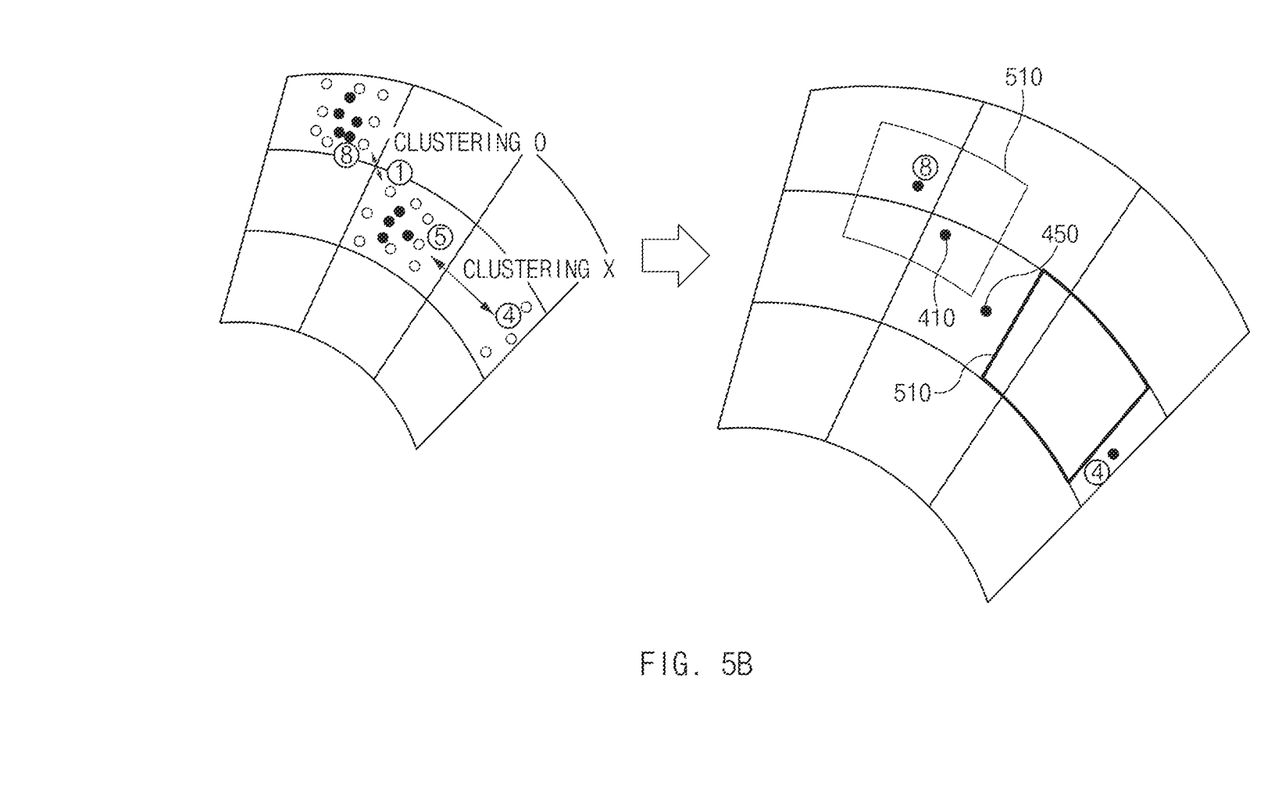
FIG. 5B is a drawing illustrating a manner for determining whether to perform clustering in an apparatus for clustering a point cloud according to embodiments of the present disclosure.
Figure 6:
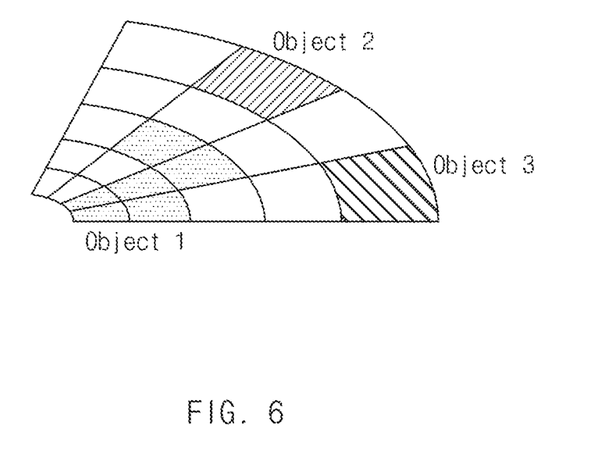
FIG. 6 is a drawing illustrating a manner for recognizing an object based on a cluster in an apparatus for clustering a point cloud according to embodiments of the present disclosure.

FIG. 3 is a drawing illustrating a structure for a circular grid map used for an apparatus for clustering a point cloud to convert the point cloud into 2D points according to embodiments of the present disclosure. FIG. 4A is a drawing illustrating reference points set in a cell by an apparatus for clustering a point cloud according to embodiments of the present disclosure. FIG. 4B is a drawing illustrating a process of detecting a plurality of representative points among 2D points in a cell in an apparatus for clustering a point cloud according to embodiments of the present disclosure. FIG. 5A is a drawing illustrating a manner for comparing representative points between respective cells in an apparatus for clustering a point cloud according to embodiments of the present disclosure. FIG. 5B is a drawing illustrating a manner for determining whether to perform clustering in an apparatus for clustering a point cloud according to embodiments of the present disclosure. FIG. 6 is a drawing illustrating a manner for recognizing an object based on a cluster in an apparatus for clustering a point cloud according to embodiments of the present disclosure.

As shown in FIG. 3, the 2D circular grid map may include a plurality of circles, each of which has a different size by using the center of a vehicle as the origin. Each of the plurality of circles may include a plurality of straight lines (radii) connected from the origin to a circular arc. The respective straight lines may be spaced apart from each other at a predetermined angle θ.

For example, a radius of a first circle 310 may be 50 cm, a radius of a second circle 320 may be 105 cm, and a radius of a third circle 330 may be 151.5 cm. In this case, a length of a straight line configuring a first cell generated by the first circle 310 may be 50 cm. Because a length of a straight line configuring a second cell generated by the second circle 320 at an outer portion of the first circle 310 is a value obtained by subtracting the radius of the first circle 310 from the radius of the second circle 320, it may be 50.5 cm. Because a length of a straight line configuring a third cell generated by the third circle 330 at an outer portion of the second circle 320 is a value obtained by subtracting the radius of the second circle 320 from the radius of the third circle 330, it may be 51 cm.

A representative point detector 22 of FIG. 1 may set 8 reference points for each cell of the 2D circular grid map.

For example, as shown in FIG. 4A, the representative point detector 22 may set 8 reference points on a boundary line of a cell. The representative point detector 22 may set reference points ①, ③, ⑥, and ⑧ at respective corners of the cell, respectively. The representative point detector 22 may set reference point ② at a middle of reference point ① and reference point ③. The representative point detector 22 may set reference point ④ at a middle of reference point ① and reference point ⑥. The representative point detector 22 may set reference point ⑤ at a middle of reference point ③ and reference point ⑧. The representative point detector 22 may set reference point ⑦ at a middle of reference point ⑥ and reference point ⑧.

Furthermore, the representative point detector 22 may detect a 2D point located closest to the reference point as a representative point in each cell on the 2D circular grid map.

For example, as shown in FIG. 4B, the representative point detector 22 may detect a point 410 located closest to reference point ① as a representative point for reference point ①. The representative point detector 22 may detect a point 420 located closest to reference point ② as a representative point for reference point ②. The representative point detector 22 may detect a point 430 located closest to reference point ③ as a representative point for reference point ③. The representative point detector 22 may detect a point 440 located closest to reference point ④ as a representative point for reference point ④. The representative point detector 22 may detect a point 450 located closest to reference point ⑤ as a representative point for reference point ⑤. The representative point detector 22 may detect a point 460 located closest to reference point ⑥ as a representative point for reference point ⑥. The representative point detector 22 may detect a point 470 located closest to reference point ⑦ as a representative point for reference point ⑦. The representative point detector 22 may detect a point 480 located closest to reference point ⑧ as a representative point for reference point ⑧.

The representative point detector 22 may detect all representative points for all cells of the 2D circular grid map.

A clustering device 23 of FIG. 1 may determine whether to perform clustering, based on the representative points of each cell, detected by the representative point detector 22. In this case, the clustering device 23 may perform a comparison process in a manner shown in FIG. 5A.

For example, the clustering device 23 may compare the representative point 410 for reference point ① of a target cell with a representative point for reference point ⑧ of a first cell C1. The clustering device 23 may compare the representative point 420 for reference point ② of the target cell with a representative point for reference point ⑦ of a second cell C2. The clustering device 23 may compare the representative point 430 for reference point ③ of the target cell with a representative point for reference point ⑥ of a third cell C3. The clustering device 23 may compare the representative point 440 for reference point ④ of the target cell with a representative point for reference point ⑤ of a fourth cell C4. The clustering device 23 may compare the representative point 450 for reference point ⑤ of the target cell with a representative point for reference point ④ of a fifth cell C5. The clustering device 23 may compare the representative point 460 for reference point ⑥ of the target cell with a representative point for reference point ③ of a sixth cell C6. The clustering device 23 may compare the representative point 470 for reference point ⑦ of the target cell with a representative point for reference point ② of a seventh cell C7. The clustering device 23 may compare the representative point 480 for reference point ⑧ of the target cell with a representative point for reference point ① of a eighth cell C8.

Furthermore, as shown in FIG. 5B, the clustering device 23 may use a size of the target cell (the middle cell) as a reference frame 510 to cluster two points when the two points which are targets to be compared are included in the reference frame 510. When the two points are not included in the reference frame 510, the clustering device 23 may fail to cluster the two points. In this case, because all points included in one cell are recognized as one cluster, that the two points are clustered may mean that all points in two cells respectively including the two points are clustered.

In FIG. 5B, because the representative point 410 for reference point ① of the target cell and the representative point for reference point ⑧ of the first cell C1 are included in the reference frame 510, the clustering device 23 may cluster the representative point 410 and the representative point for reference point ⑧ of the first cell C1. However, because the representative point 450 for reference point ⑤ of the target cell and the representative point for reference point ④ of the fifth cell C5 are not included in the reference frame 510, the clustering device 23 may fail to cluster the representative point 450 and the representative point for reference point ④ of the fifth cell C5.

Furthermore, when an angle defined by the representative point 410 for reference point ① of the target cell and the representative point for reference point ⑧ of the first cell C1 is less than a threshold angle $\theta$ and when a difference between a distance from the origin to the representative point 410 for reference point ① of the target cell and a distance from the origin to the representative point for reference point ⑧ of the first cell C1 is less than a threshold, the clustering device 23 may cluster the representative point 410 for reference point ① of the target cell and the representative point for reference point ⑧ of the first cell C1.

The clustering device 23 may determine whether to perform clustering for all cells in such a manner.

In addition, a controller 20 of FIG. 1 may further include an object recognizing device 23. As shown in FIG. 6, such an object recognizing device 24 may recognize an object based on the result clustered by the clustering device 23.

Figure 7:
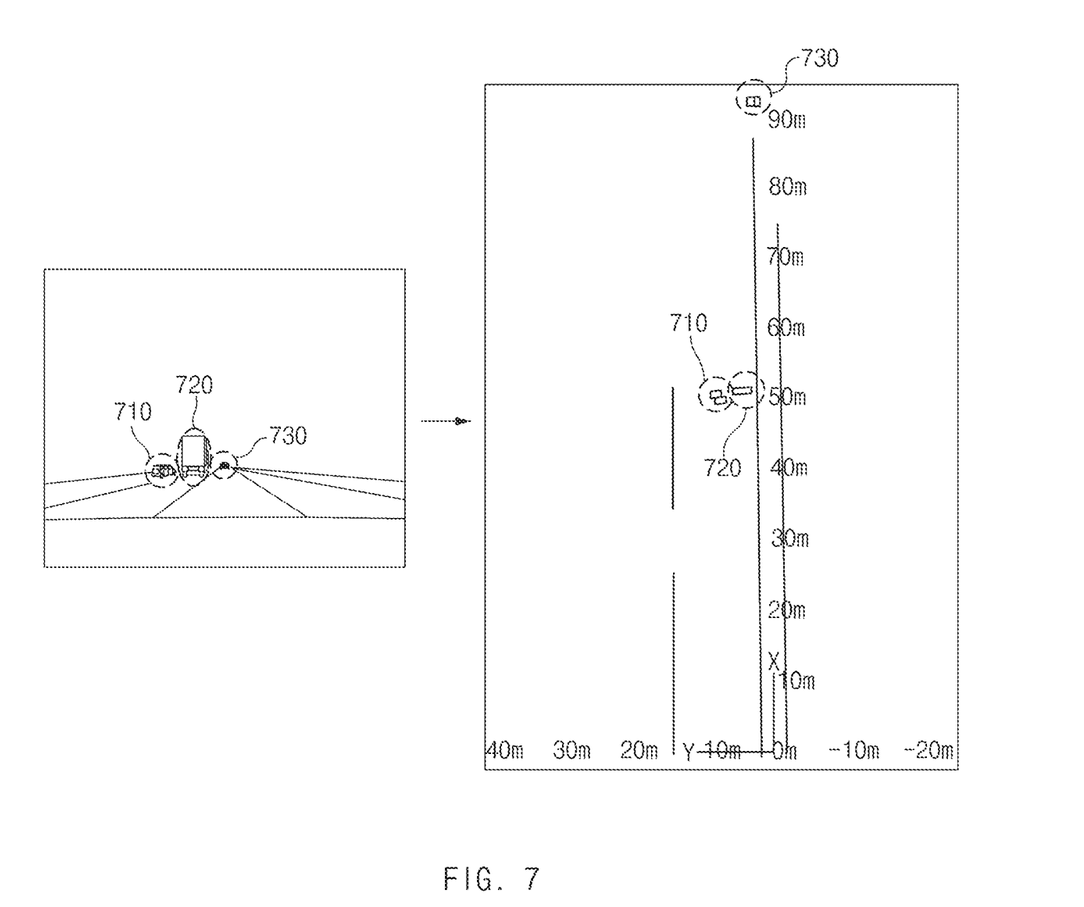
FIG. 7 is a drawing illustrating performance of an apparatus for clustering a point cloud according to an embodiment of the present disclosure.

FIG. 7 is a drawing illustrating performance of an apparatus for clustering a point cloud according to embodiments of the present disclosure.

As shown in FIG. 7, reference numerals 710 and 720 denote short-range vehicles, and reference numeral 730 denotes a long-range vehicle.

The apparatus for clustering the point cloud according to embodiments of the present disclosure may cluster the short-range vehicles 710 and 720 and the long-range vehicle 730 as one object.

Figure 8:
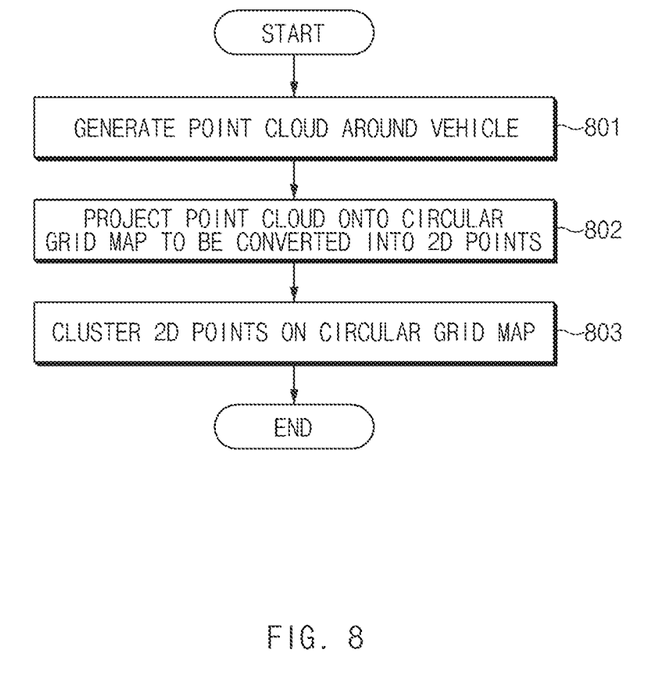
FIG. 8 is a flowchart illustrating a method for clustering a point cloud according to embodiments of the present disclosure.

FIG. 8 is a flowchart illustrating a method for clustering a point cloud according to embodiments of the present disclosure.

First of all, in operation 801, a 3D LiDAR sensor 10 of FIG. 1 may generate a point cloud around a vehicle.

In operation 802, a controller 20 of FIG. 1 may project the point cloud onto a circular grid map to be converted into 2D points.

In operation 803, the controller 20 may cluster the 2D points on the circular grid map.

Figure 9:
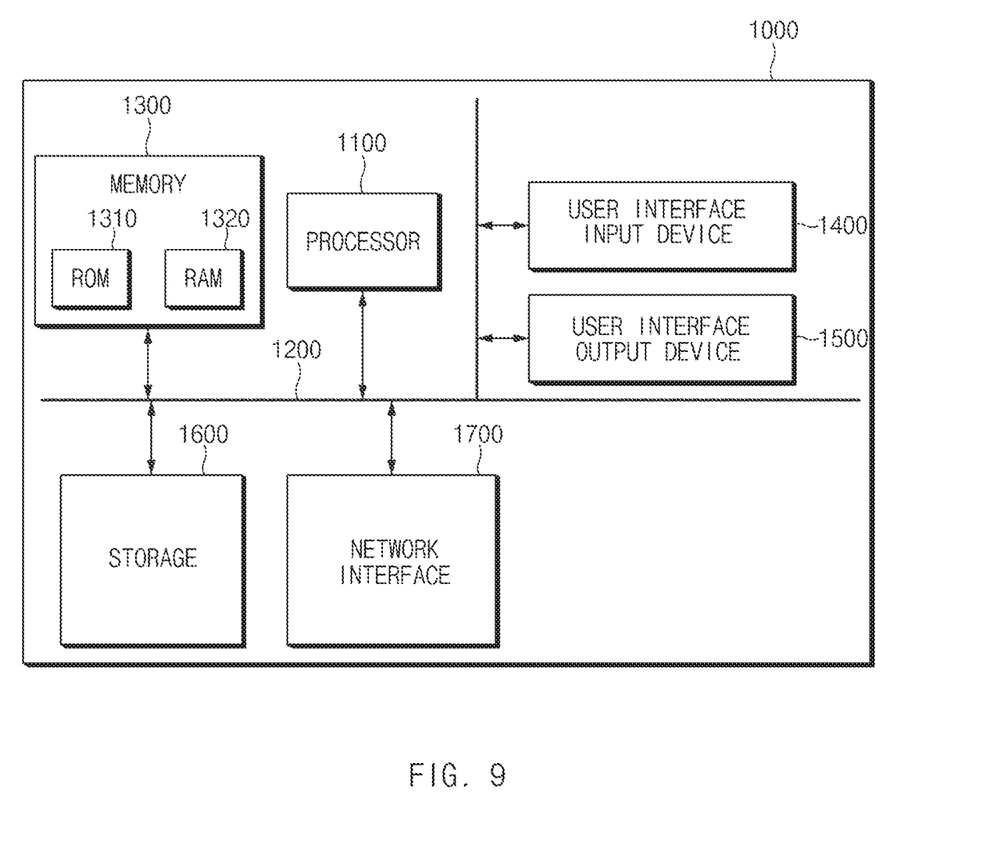
FIG. 9 is a block diagram illustrating a computing system for executing a method for clustering a point cloud according to embodiments of the present disclosure.

FIG. 9 is a block diagram illustrating a computing system for executing a method for clustering a point cloud according to embodiments of the present disclosure.

As shown in FIG. 9, the method for clustering the point cloud according to embodiments of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for clustering the point cloud according to embodiments of the present disclosure may optimally cluster all of points indicating a long-range object and points indicating a short-range object by projecting a point cloud obtained by means of the 3D LiDAR sensor onto the 2D circular grid map to be converted into 2D points and clustering the 2D points on the circular grid map based on a size of a reference cell.

Furthermore, embodiments of the present disclosure may ensure efficiency and speed by optimally clustering all of points indicating a long-range object and points indicating a short-range object without applying a complex parameter.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for clustering a point cloud, the apparatus comprising:
 a three-dimensional (3D) light detection and ranging (LiDAR) sensor configured to generate a point cloud around a vehicle; and
 a controller configured to project the point cloud generated by the 3D LiDAR sensor onto a circular grid map to be converted into two-dimensional (2D) points, the circular grid map including a plurality of cells, and to cluster the 2D points on the circular grid map,
 wherein the controller is configured to:
 detect a plurality of representative points for each cell of the circular grid map; and
 determine whether to perform clustering between the respective representative points based on the representative point for each cell.

2. The apparatus of claim 1, wherein:
 the circular grid map includes a plurality of circles,
 each of the plurality of circles has a different size,
 each of the plurality of circles uses as an origin thereof a center of the vehicle,
 each of the plurality of circles includes a plurality of straight lines connected from the origin to a circular arc, and
 the plurality of straight lines are spaced apart from each other at a threshold angle.

3. The apparatus of claim 2, wherein:
 a first straight line configures a first cell generated by a first circle of the plurality of circles, the first circle being the smallest circle of the plurality of circles,
 a second straight line configures a second cell generated by a second circle of the plurality of circles at an outer portion of the first circle,
 a third straight line configures a third cell generated by a third circle of the plurality of circles at an outer portion of the second circle,
 the first straight line is shorter in length than the second straight line, and
 the second straight line is shorter in length than the third straight line.

4. The apparatus of claim 1, wherein the controller is configured to:
 set a plurality of reference points for each cell of the circular grid map; and
 detect a 2D point located closest to each of the plurality of reference points as the representative point for each cell.

5. The apparatus of claim 4, wherein the plurality of reference points are located on a boundary line of a given cell of the plurality of cells.

6. The apparatus of claim 1, wherein the controller is configured to:
 cluster a representative point of a first cell of the plurality of cells and a representative point of a second cell of the plurality of cells when the representative point of the first cell and the representative point of the second cell are included in a reference frame.

7. The apparatus of claim 6, wherein:
 a shape and a size of the reference frame correspond to a shape and a size of the first cell, or
 the shape and the size of the reference frame correspond to a shape and a size of the second cell.

8. The apparatus of claim 1, wherein the controller is configured to:
 recognize one cluster as one object.

9. The apparatus of claim 8, wherein the object is a vehicle.

10. A method for clustering a point cloud, the method comprising:
 generating, by a 3D LiDAR sensor of a vehicle, a point cloud around a vehicle;
 projecting, by a controller of the vehicle, the point cloud onto a circular grid map to be converted into two-dimensional (2D) points, the circular grid map including a plurality of cells; and
 clustering, by the controller, the 2D points on the circular grid map,
 wherein the clustering of the 2D points on the circular grid map comprises:

detecting a plurality of representative points for each cell of the circular grid map; and determining whether to perform clustering between the respective representative points based on the representative point for each cell.

11. The method of claim 10, wherein:

the circular grid map includes a plurality of circles, each of the plurality of circles has a different size, each of the plurality of circles uses as an origin thereof a center of the vehicle, each of the plurality of circles includes a plurality of straight lines connected from the origin to a circular arc, and the plurality of straight lines are spaced apart from each other at a threshold angle.

12. The method of claim 11, wherein:

a first straight line configures a first cell generated by a first circle of the plurality of circles, the first circle being the smallest circle of the plurality of circles, a second straight line configures a second cell generated by a second circle of the plurality of circles at an outer portion of the first circle, a third straight line configures a third cell generated by a third circle of the plurality of circles at an outer portion of the second circle, the first straight line is shorter in length than the second straight line, and the second straight line is shorter in length than the third straight line.

13. The method of claim 10, wherein the detecting of the plurality of representative points comprises:

setting a plurality of reference points for each cell of the circular grid map; and detecting a 2D point located closest to each of the plurality of reference points as the representative point for each cell.

14. The method of claim 13, wherein the plurality of reference points are located on a boundary line of a given cell of the plurality of cells.

15. The method of claim 10, wherein the determining of whether to perform the clustering comprises:

clustering a representative point of a first cell of the plurality of cells and a representative point of a second cell of the plurality of cells when the representative point of the first cell and the representative point of the second cell are included in a reference frame.

16. The method of claim 15, wherein:

a shape and a size of the reference frame correspond to a shape and a size of the first cell, or the shape and the size of the reference frame correspond to a shape and size of the second cell.

17. The method of claim 10, further comprising:

recognizing, by the controller, one cluster as one object.

18. The method of claim 17, wherein the object is a vehicle.

* * * * *